April 23, 1968     M. E. CAVANAUGH     3,379,893
ELECTRICAL BUS MONITORING SYSTEM FOR AIRCRAFT
Filed April 8, 1965     3 Sheets-Sheet 1
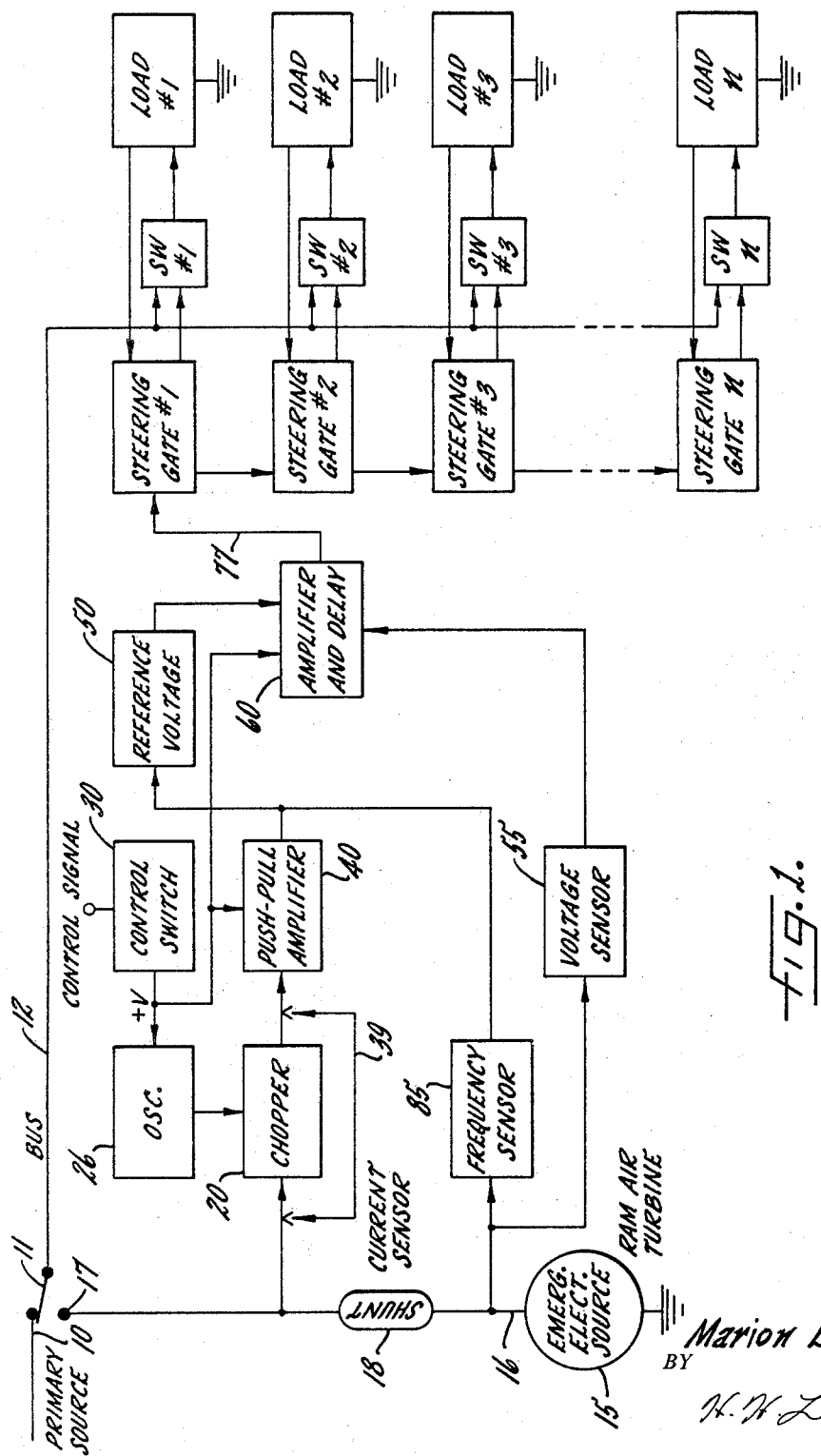

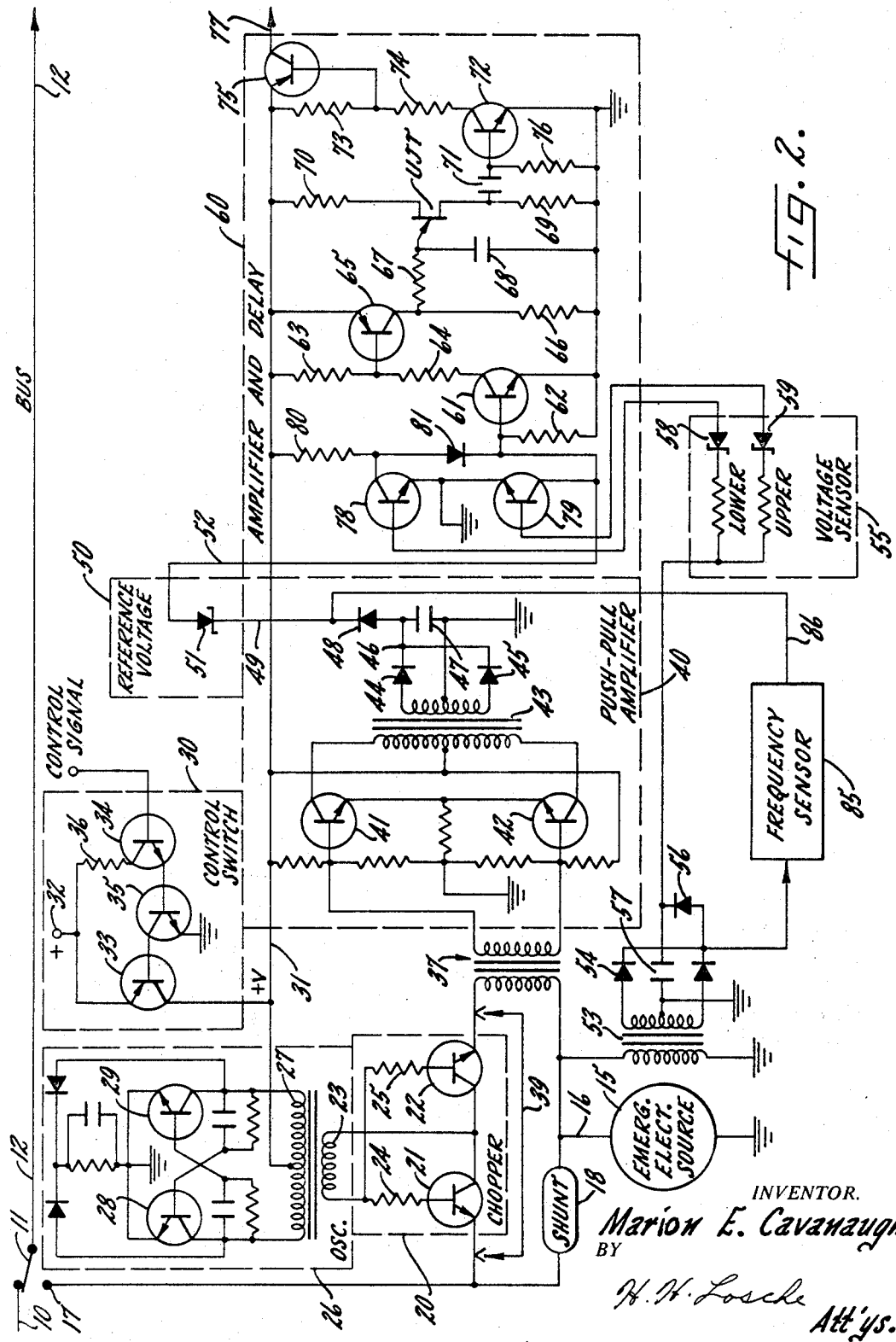

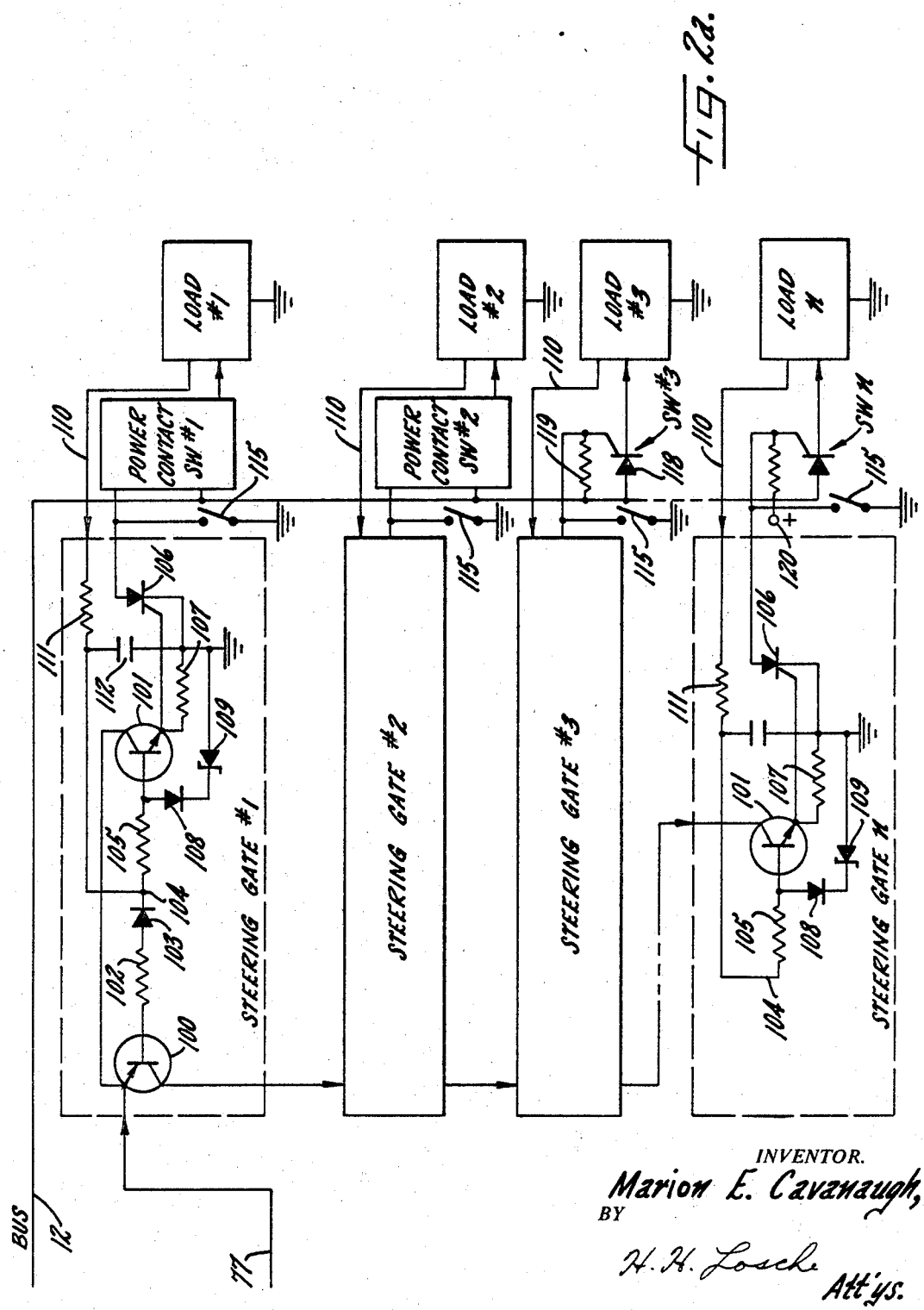

United States Patent Office 3,379,893
Patented Apr. 23, 1968

3,379,893
ELECTRICAL BUS MONITORING SYSTEM
FOR AIRCRAFT
Marion E. Cavanaugh, Dallas, Tex., assignor, by mesne assignments, to the United States of America as represented by the Secretary of the Navy
Filed Apr. 8, 1965, Ser. No. 446,751
9 Claims. (Cl. 307—41)

ABSTRACT OF THE DISCLOSURE

An aircraft single electrical supply bus to a plurality of electrical loads having steering gates and switches coupled in conjunction with load sensing and voltage supply sensing circuits to automatically switch "off" load circuits in succession in accordance with a prearranged priority until the electrical source capability balances the load demand.

Background of the invention

This invention relates to electrical bus control systems of aircraft and more particularly to the use of a single electrical bus with solid state control devices for monitoring lower priority electrical loads out of connection with the electrical bus when emergency generating equipment is connected thereto until the load balances with the electrical capability or power of the emergency generating equipment.

Typical aircraft electrical bus control systems utilize three buses to establish electrical load priorities for loading during three flight conditions of interest, viz., normal flight, emergency flight, and emergency landing. The three buses, in order of descending priority are: the emergency bus, the primary bus, and the secondary bus. Under normal flight conditions these three buses are supplied with power from the internal main electrical source of the aircraft or main generators. During an emergency flight condition, only the primary bus and the emergency bus are supplied with power. Such emergency power is commonly obtained from an external ram-air turbine or air turbine which drives a generator mechanically. During an emergency landing condition the primary bus is disconnected leaving only the emergency bus functioning. This system of removing power from various electrical devices on an airplane by disconnecting the entire bus that transmits the power is inefficient because it removes devices in groups rather than individually. Thus, if there is only a small reduction in available electric power for all of the devices of the airplane, shutting off the power to a single nonessential load, such as a radio, might bring the situation back into balance. With the three bus system, every power-consuming apparatus which is coupled with the respective bus might be shut off in order to shut off the one radio. The ram-air turbine generator or air turbine, which is swung into the air stream from the aircraft in a number of these well-known emergency systems, usually drives an emergency hydraulic system as well as an emergency electrical generator. A typical air turbine is capable of providing 7.5 kilowatts (kw.) of power at its rated speed in normal flight of the aircraft and about 6 kw. at low landing speeds. The emergency hydraulic system, when activated, would require about 5.0 kw. of this power, leaving only 2.5 kw. of available electrical power at rated speed and 1.0 kw. at a low landing speed. The power capability set aside for the emergency hydraulic system is very seldom required; yet, this power must be kept in reserve, and cannot presently be transfered to the emergency electrical system where it could be used to an advantage. Since the chance of a failure of the main hydraulic system is quite remote, directing the 5.0 kw. to the electrical system while maintaining the capability of switching it back to the hydraulic system, if necessary, would be a definite improvement in the overall efficiency of the aircraft system. While the pilot does already have the opportunity of switching all of the loads on the primary bus onto the emergency generating source along with the emergency loads during an emergency landing condition, he does incur the possibility of overloading the prime mover emergency source since he does not know the total electrical power requirement of the primary bus at any given time.

Summary of the invention

In the present invention a single electrical bus is used throughout the aircraft and all of the electrical loads are connected to this single bus. This single bus is normally coupled to the main electrical supply source of the aircraft, but when an emergency arises it is necessary for the pilot to switch from the main electrical source upon the failure thereof to the emergency electrical source. At the same time the pilot throws the emergency switch to activate the emergency bus monitoring system which automatically disconnects low priority electrical loads from the single bus in accordance with a preset priority during an overload condition. This single bus monitoring load system is made to function at its optimum capability to permit the pilot to turn "on" lower priority loads during an over generation condition of the emergency electrical source and for the monitor to turn "off" electrical loads automatically during an overload condition of the emergency electrical source. The monitoring system of this invention utilizes only solid state elements to provide instantaneous control as well as light, compact, and reliable equipment for aircraft. If the aircraft utilizes alternating current (AC) equipment and the generating source is an AC alternator, the monitoring system will utilize a frequency sensor to determine the speed of the alternator to ascertain whether the electrical generator is being driven fast enough to support the normal load. If the electrical equipment of the aircraft and the electrical generator are direct current (DC) components, a tachometer may be used on the generator and the monitoring system will incorporate a chopper circuit to produce chopped DC to provide monitoring control. Each electrical load is coupled to the single electrical bus through a switch that is controlled by a control circuit and each control circuit is coupled to a steering gate in circuit with the monitoring system. The first steering gate is coupled to the electrical load of the lowest priority, the second steering gate is coupled to the load of the next lowest priority, and so on through all the electrical loads. The monitoring system which produces a "turnoff" signal is coupled to the first steering gate and each steering gate is coupled to sense the electrical load to cause each steering gate to disconnect its electrical load in sequence in accordance with the condition of whether an electrical load actually exists. For example, if the first electrical load happens to be a radio and this radio is in its "off" condition yet coupled to the single electrical bus, the first steering gate will not disconnect this radio from the electrical bus but will be conditioned to transmit the "turnoff" signal to the second steering gate. If the next lowest priority load happens to be turned "on," this will be sensed by the second steering gate and this steering gate will operate to disconnect this next lowest electrical load from the single electrical bus. Thus, under emergency conditions the electrical loads will be switched "off" up through the lower priority loads toward the higher priority loads until the total electrical load is in balance with the electrical output capabilities or power of the emergency electrical source. On the otherhand, if a number of the electrical loads have been disconnected from the single electrical bus and the emergency electrical source increases in its power output as by speed-up of the ram-air turbine, the aircraft personnel can readily reconnect the higher priority loads to the system. In this manner decisions of loading the electrical bus to the optimum output of the emergency electrical source are made automatically and the pilot will not be burdened with these decisions at a time the aircraft is under an emergency condition. This automatic means of monitoring the electrical loads in accordance with the capabilities of the emergency electrical source is extremely helpful at a time when the pilot is called upon to switch in the emergency hydraulic system under an emergency landing condition. It is therefore a general object of this invention to provide a single electrical bus system for aircraft which can be switched to an emergency electrical source and a means under emergency conditions to automatically monitor electrical loads "off" in sequence in accordance with a preset priority to avoid overload of the emergency electrical source without reducing the load below the emergency source power capabilities.

*Brief description of the drawing*

These and other objects and the attendant advantages, features, and uses will become more apparent to those skilled in the art as a more detailed description proceeds when considered along with the accompanying drawings in which:

FIGURE 1 is a block circuit schematic of the single electrical bus load monitoring system; and FIGURES 2 and 2a are circuit schematic diagrams partially in block of the block circuit schematic shown in FIGURE 1.

*Description of the preferred embodiment*

Referring more particularly to FIGURE 1 where the invention is used in an aircraft to supply electrical loads, a primary source of electrical current is applied over the bus 10 through a switch 11 that normally connects the single electrical bus 12 supplying all electrical loads, shown as loads Number 1, Number 2, Number 3 and so on through load $n$. Each load 1 through $n$ is coupled through a switch correspondingly numbered, SW1, SW² ... SW$n$, which switches are switchable by a control circuit, later to be described in the description of FIGURE 2a.

An emergency electrical source, such as a ram-air turbine 15 driving an electrical generator, produces electrical energy on its output 16 to an alternate contact 17 on the switch 11 such that the primary source 10 may be disconnected and the emergency source 15 connected to the single electrical bus 12 by the switch 11. The other terminal is connected to ground which serves as one conductor or fixed potential for the system, such as the aircraft frame. In the output conductor 16 is a current sensor, such as a shunt 18. Also coupled to the output conductor 16 prior to the current sensor is a voltage sensor 55. If the electrical emergency source 15 is a DC generator, a chopper circuit 20 couples the output of the current sensor 18 through a current-to-voltage converter push-pull amplifier 40 and rectifier circuit to the input of a reference voltage 50, the output of which is to an amplifier and delay ciricut 60. The chopper circuit 20 is driven by a square wave oscillator 26 initially having a voltage supply switchably coupled thereto through a control switch 30. On the other hand, if the emergency electrical source 15 is an AC generator, the chopper circuit 20 and oscillator 26 would be eliminated and the ouput side of the current sensor 18 would be directly connected by the conductor means 39 to the push-pull amplifier 40, and a frequency sensor 85 would be added, the output of which would be to the input of the reference voltage 50. The output of the amplifier and delay circuit 60 is by way of a conductor means 77 to the first steering gate Number 1 of a number of steering gates 1 through $n$ corresponding, respectively, to the loads 1 through $n$ and the switches 1 through $n$. The load "turnoff" signal coming out of the amplifier and delay circuit 60 over the output conductor 77 will cause the steering gates to operate in sequence to turn off as many of the loads 1 through $n$ as is necessary to bring a balance between the output power of the emergency electrical source 15 and the higher priority loads 1 through $n$, as will be made clear in the description of the FIGURES 2 and 2a.

Referring more particularly to FIGURE 2 where like reference characters refer to like parts as shown in FIGURE 1, the primary electrical source 15 is coupled through switch 11 to the single bus 12 to supply all of the electrical loads of the aircraft. The emergency electrical source 15 having its output 16 coupled through a current sensor 18 to the switch contact 17 will be capable of supplying electrical voltage to the single bus 12 when switch 11 is thrown to the contact 17. If the emergency electrical source 15 is a DC generator, the output side of the shunt 18 will be connected to the chopper circuit 20 having two transistors 21 and 22 therein with the input coupled to the emitter of transistor 21 and an output coupled to the emitter of transistor 22. The collectors are coupled in common to one end of a secondary winding 23 of a transformer coupled oscillator 26. The other terminal of the secondary winding 23 is coupled in parallel to the bases of transistors 21 and 22 through resistors 24 and 25, respectively. The chopper circuit 20 will chop the sampled current in accordance with the squtre wave oscillations induced in the primary winding 27 of the transformer coupled oscillator and chopper circuit. The oscillator circuit is a solid state oscillator including two transistors 28 and 29 coupled in the usual and ordinary manner to produce square wave oscillations. Since this oscillator 26 is of a well-known conventional type, further description thereof will not be provided herein since the construction, functions, and resuts thereof are considered well-known in the art. The oscillator 26 is supplied operating voltage at a center-tap of the primary winding 27 from the control switch 30. The control switch 30 provides a positive voltage on its conductor output 31 from a voltage source 32 coupled to the emitter of a transistor 33, the output 31 being taken from the collector. An electrical control signal to switch the transistor 33 is coupled to the base of a transistor 34, the emitter of which is coupled ot the base of a transistor 35 having its collector coupled to the base of transistor 33. The collector of transistor 34 is coupled to the positive voltage source 32 through a resistor 36 and the emitter of transistor 35 is grounded. The transistors 34 and 35 are NPN type while the transistor 33 is of the PNP type such that, when a positive control signal is switched on to the base of transistor 34 this transistor will be turned "on" to turn "on" the transistor 35 and, by grounding the base of transistor 33, transistor 33 will be turned "on" to connect the positive voltage source 32 to the output conducor 31. This will energize the oscillator 26 to generate oscillations for the chopper circuit 20, as well as to energize the monitoring circuit.

The output of the chopper 20 is through the primary winding of an isolating transformer 37 back to the input side of the current sensor 18. The secondary of the transformer 37 is coupled as an input to the push-pull amplifier 40 having two transistors 41 and 42. The secondary of transformer 37 has the opposite leads thereof coupled to the bases of transistors 41 and 42, respectively, the collectors of these transistors being coupled through a primary winding of a transformer 43. The primary of transformer 43 is center-tapped and coupled to the positive voltage lead 31 from the control switch 30 to supply collector and biasing voltage to the push-pull ampifier. The emitter and base biases are produced by biasing resistors from the positive votage conductor 31 in the usual and well-known manner to cause push-pull amplifier 42 to operate in the expected manner. The secondary of transformer 43 is center-tapped to ground and each lead is coupled respectively through diodes 44 and 45 to an output terminal 46 of rectified voltage. This terminal 46 is coupled to one plate of a capacitor 47 the opposite plate of which is grounded to filter the direct current output voltage from the diodes 44 and 45. Terminal 46 is also coupled through an isolation diode 48 to produce a DC output voltage on the output conductor 49. Accordingly, the push-pull amplifier and transformer coupled rectifiers 44, 45 converts chopper DC or AC current into a DC voltage. As a current drop increases across the current sensor or shunt 18, the chopped current through the transformer 37 will be amplified in the push-pull amplifier 40 and rectified by 44 and 45 to produce a decrease in DC voltage on the output 49; that is, as the current sensed across the shunt 18 varies up and down, the DC voltage on the output 49 likewise will vary up and down.

The output 49 of the push-pull amplifier and rectifier is coupled to a reference voltage 50 established by a Zener diode 51 oriented with the output of the push-pull amplifier 49 coupled to the cathode thereof and having an output 52 coupled to the anode to establish a high resistance until the voltage on the conductor 49 exceeds a voltage established by the Zener voltage of the Zener diode 51. The output 52 of the reference voltage 50 is coupled to the amplifier and delay circuit 60 by direct connection to the base of an NPN transistor 61 therein. The emitter of transistor 61 is coupled directly to ground and the base thereof is biased through a biasing resistor 62 from ground. The collector has collector voltage supplied thereto from the positive voltage source 31 through resistors 63 and 64, the junction of these resistors being coupled to the base of a PNP transistor 65 having its emitter directly coupled to the positive voltage conductor 31 and its collector coupled through a collector load resistor 66 to ground. The collector of transistor 65 is also coupled through a resistor 67 to the emitter of a unijunction transistor UJT with the first and second bases coupled through resistors 69 and 70 between ground and the positive voltage conductor 31. The emitter of the UJT is coupled to one plate of a capacitor 68, the opposite plate of which is grounded. The first base is coupled through a capacitor 71 to the base of an NPN transistor 72, the emitter of which is grounded and the collector of which is coupled through resistors 73 and 74 to the conductor 31. The junction of resistors 73 and 74 is directly coupled to the base of a PNP transistor 75 while the base of transistor 72 is biased by the resistor 76. The output of the amplifier and delay circuit is taken from the collector of transistor 75 on the conductor 77.

A voltage sensor 55 senses the voltage from the output conductor 16 of the emergency source 15, this voltage being conducted by the transformer 53 and full-wave rectified by the diodes 54 producing a DC voltage which is isolated by the diode 56 and smoothed by the capacitor 57 for the voltage sensor 55. The voltage sensor 55 consists of resistor and Zener diode combinations 58 and 59 to establish lower voltage and upper voltage limits. The lower voltage Zener diode output is coupled to the base of an NPN transistor 78 in the amplifier and delay circuit 60 while the output of the upper voltage limit Zener diode 59 is coupled to the base of an NPN transistor 79. The emitters of transistors 78 and 79 are connected directly to ground and the collector of transistor 79 is connected to the base of transistor 61. The collector of transistor 78 has collector voltage supplied thereto from the conductor 31 through a resistor 80 and is also coupled through a diode 81 to the base of transistor 61. Whenever the current sensor 18 and current-to-voltage converter 41–48 produce an output voltage on the output 49 of the push-pull amplifier 40 which exceeds the Zener voltage of diode 51 of the reference voltage 50, this voltage signal will be appied to the base of transistor 61. As the low voltage limit is approached in the voltage sensor 55 at which time the Zener voltage will cut off voltage output from 58, the voltage will be removed from the base of transistor 78 allowing this transistor to be rendered nonconductive. The voltage from the voltage supply lead 31 will increase across resistor 80 to produce a voltage signal through the diode 81 to be impressed on the base of transistor 61. Upon sensing an over voltage by the upper voltage limit of the resistor diode combination 59, a voltage signal will be applied to the base of transistor 79 placing this transistor in a conductive state to reduce the base of transistor 61 to zero regardless of whether the transistor 78 or the reference voltage 50 is attempting to place a voltage signal on the base of this transistor 61. A voltage signal on the base of transistor 61 will place this transistor into conduction which will produce an inversion of this signal on the output of transistor 65 to turn on unijunction UJT which causes transistor 72 to conduct, and likewise transistor 75 to conduct, to produce an output voltage signal on the conductor 77. This voltage signal on the output 77 is the "turnoff" signal for the steering gates and electrical loads, as will be more fully described in the description of FIGURE 2a. The capacitor 68 and resistor 67 provide a timing circuit producing a charge and discharge time of applying the signal from the base of transistor 61 to the emitter of the UJT to cause pulses to be applied to the base of transistor 72. The time constant established by the resistor 67 and capacitor 68 on the emitter of unijunction UJT determines the time rate or delay rate of each pulse applied to the emitter of unijunction UJT to produce output "turnoff" pulse signals on the conductor 77, one "turnoff" pulse signal being generated during each time constant of resistor 67 and capacitor 68.

If the emergency electrical source 15 is an AC generator, the chopper circuit 21 and oscillator circuit 26 may be eliminated by the transformer 37 being coupled directly across the shunt 18 through the conductor means 39. It will be necessary then, to use the frequency sensor 85 which has its input coupled to the output of the rectifier diode 54 prior to the isolating diode 56 and smoothing capacitor 57 to sense the DC pulses corresponding to the frequency of the emergency generator output. Whenever the frequency of the emergency generator 15 falls below a predetermined amount, an output voltage will be produced which is coupled by the conductor 86 to the conductor 49 coupled as the input of the reference voltage 50 which output voltage signal will exceed the Zener voltage of the Zener diode 51 to produce an input signal on the base of transistor 61 to cause a "turnoff" signal on the output 77 of the amplifier and delay circuit 60, as aforesaid. The frequency sensor may be of any well-known conventional type ordinarily used for sensing the frequency of aircraft alternator generators as set forth in the Standard Handbook for Electrical Engineers by A. E. Knowlton, Ninth Edition, 1957, published by McGraw-Hill Book Company, Inc. Section 19–227. The current and voltage sensors actually provide the power factor for the monitoring logic circuits while the frequency sensor porvides the speed factor of the emergency energy source. To eliminate all possibilities of overloading the emergency energy source it is necessary that the torque of the energy source be monitored. Since torque is proportional to power and inversely proportional to speed, as given by the equation $$T = K\frac{P}{S}$$

where K is a constant, the torque is monitored in the monitoring logic of the system.

As may be seen from the description, supra, if a high current is sensed by the current sensing means 18 through the current-to-voltage converter push-pull amplifier 40 to produce a voltage signal on the output 49 exceeding the voltage reference set by the Zener diode 51, or if a predetermined low frequency exists to produce an output voltage signal on the output 86 of the frequency sensor 85 exceeding the reference voltage set by the Zener diode 50, the amplifier and delay circuit 60 will be energized to produce "turnoff" output pulses on the output conductor 77 to cut off electrical loads, as will soon be described in the description of FIGURE 2a. If a low voltage is sensed by the voltage sensor 55, in which case the voltage will be too low to exceed the Zener voltage in the Zener resistor combination 58, the base of transistor 78 will fall to zero cutting off this transistor thereby causing a rise in voltage across resistor 80 which voltage rise is conducted through the diode 81 to the base of transistor 61 again energizing the amplifier and delay circuit 60 to cause "turnoff" signal voltage pulses to be conducted over the output conductor 77. If a high voltage sensed by the voltage sensor 55 is sufficiently high to exceed the Zener diode voltage of the Zener diode in the combination 59, this voltage will be applied to the base of transistor 79 rendering it conductive to short out any signals on the base of transistor 61 de-energizing, or holding the amplifier and delay 60 de-energized so that no "turnoff" pulses will appear on the output conductor 77.

Referring more particularly to FIGURE 2a, which is a partially block and partially circuit diagram of the steering gates, switches, and loads, the output conductor 77 is shown connected to the first steering gate Number 1. Steering gate Number 1 includes a PNP transistor 100 and an NPN transistor 101 with the input conductor 77 thereto being coupled in common to the emitter of transistor 100 and the collector of transistor 101. The base of transistor 100 is coupled through a resistor 102 and an isolating diode 103 to a terminal point 104, this terminal point being coupled through a resistor 105 to the base of transistor 101. The emitter of transistor 101 is coupled to the control terminal of a silicon control rectifier (SCR) 106 and also coupled through resistor 107 to ground. The base of transistor 101 is coupled through a diode 108 and a Zener diode 109 in series cathode back-to-back relation to ground. The diode 108 and Zener diode 109 protect the base of transistor 101 from high voltage transients of the load which would otherwise be damaging to this transistor. The isolating diode 103 protects transistor 100. The cathode of the SCR 106 is coupled directly to ground while the anode of this SCR 106 is coupled through the control element of a power contact switch Number 1 to a voltage source, as shown by SW #3 or SW #n, soon to be described. The load on the output side of its own "on" "off" switch is coupled by wal of conductor means 110 and resistor 111 to the terminal point 104, this terminal 104 being coupled to one plate of a capacitor 112 with the opposite plate being coupled to ground to provide a short storage of the load voltage sufficient to last during the period between "turnoff" pulses. The collector of transistor 100 is coupled to the emitter of the similar transistor 100 in steering gate Number 2, each steering gate being circuited in the same manner as shown and described for the steering gate Number 1 with the exception of the last steering gate n. In the steering gate n transistor 100, resistor 102, and diode 103 are eliminated since they are not necessary in transmitting the input signals over the input conductor 77 to any other steering gates.

As illustrated for steering gates Number 1 and Number 2, the switches Number 1 and Number 2 are shown as power control switches and are preferably solid state switches as shown by switches Number 3 and n. When it is desirable or necessary for the aircraft personnel to return higher priority equipment to the automatic control of the monitor where the ram-air generator has increased its capabilities, the "ON signal" switch 115 may be closed to short-circuit the SCR 106. If SCR switches are used as shown by switches Number 3 and n, the anode of the SCR 106 may be coupled to the control electrode of the SCR switch, such as 118, to clamp the control electrode to ground whenever the SCR 106 is placed in a conductive state. When the SCR 106 is not in its conductive state, the SCR 118 switch will be held in a conductive state by a voltage applied through a resistor 119 from the bus 12 or from any other DC source, such as a source connected to terminal 120 when AC voltage is conducted over the bus 12.

As may be determined from the description of FIGURE 2a, if voltage pulses are applied from the amplifier and delay circuit 60 over the conductor 77, these pulses will be applied to the emitter of transistor 100 and the collector of transistor 101. If the load voltage sensed by way of the conductor means 110 and resistor 111 is zero, indicating that the load is turned "off" by its own switch, this zero voltage at the terminal 104 will turn "on" transistor 100 and direct the input pulses over conductor 77 to the second steering gate. Zero voltage on the base of transistor 101 will render this transistor nonconductive. Each steering gate will sense the condition of the load and each gate, has no load in operation, will switch its transistor 100 to conduct the "turnoff" pulses to the next steering gate. Now, if the load sensed over conductor 110 and resistor 111 is high indicating that the load is switched "on" and is being operated, this high voltage at terminal point 104 will cause transistor 100 to be cut "off" in conduction and transistor 101 to be conductive. The pulses of the input conductor 77 will be conducted to the control terminal of SCR 106 rendering it conductive to clamp the switch operator to ground thereby opening the switch SW. The rate at which the electrical loads are turned off, or disconnected from the bus 12, is determined by the frequency of the pulsesh applied over conductor 77 and this frequency is determined by the time constant established by the resistor 67 and capacitor 68 in the amplifier and delay circuit 60. If the "on" "off" switch of the load is "on" but the switch SW is "off," the load sense will be the same as if SW were "on" and the load switch "off." Each pulse occurring over 77 will turn off the next high priority electrical load until the voltage signal established by the high current condition, the low frequency condition, or the low voltage condition vanishes to de-energize the amplifier and delay circuit 60. Each switch SW which is opened by the steering gate related thereto will remain open as long as the "turnoff" pulses continue since these pulses are applied to the collector of transistor 101 and the voltage stored on capacitor 112 prevents the SCR 106 from being back baised to render the SCR nonconductive. As soon as the "turn-off" pulses cease, all SCR's 106 in the several steering gates can be cut off in conduction by closing the "ON signal" switches 115. If a high voltage is sensed by the voltage sensor 55, the amplifier and delay circuit 60 will be disabled and any signals produced by the high current, low voltage, or low frequency conditions tending to energize this amplifier and delay circuit will be rendered ineffective and, accordingly, no steering gates will be signaled for a "turnoff" and all loads will remain connected to the bus 12. Where a low voltage, high current, or low frequency is sensed by the current voltage, or frequency devices to produce a "turnoff" signal at the output of the amplifier and delay circuit 60, the electrical loads will be disconnected from the bus 12 until the high current, low voltage, or low frequency is back to normal at which time there will be balance between the power output capabilities of the emergency electrical source and the electrical loads.

*Operation*

In the operation of this device let it be assumed that loads 1, 2, 3, etc., to load n are arranged in the order of the lowest priority to highest priority of electrical need in an aircraft and that a single bus 12 is supplying these loads through the power contact switches 1 through n under control of steering gates 1 through n, respectively. Let it be assumed that the primary source of electrical power in the aircraft has become faulty and it is necessary for the pilot to switch to the emergency condition for which switch 11 will be thrown to contact 17 and the control signal will be applied to the control switch 30 to start the operation of the monitoring circuit. If the emergency electrical source is a direct current generator, the frequency sensor 85 will not be incorporated in the monitoring system but the chopper and oscillator circuits 20 and 26 will be incorporated, as shown. On the otherhand, if the emergency electrical source 15 is an AC generator, the chopper circuit 20 and oscillator 26 will be eliminated and the frequency sensor 85 will be incorporated in the system. If the emergency electrical supply is a DC generator, the frequency sensor would not be used but it may be necessary to use a tachometer or some other instrument to monitor the speed of the DC generator. Let it further be assumed, that in this emergency condition the aircraft is losing speed and that the ram-air turbine is accordingly losing speed. Under this condition probably one of the conditions of a voltage drop, a current rise, or, if the emergency electrical source is an AC generator, the frequency will drop off to produce signals on the output 49 or output 86 which exceeds the reference voltage 50 or a low voltage output of the voltage sensor 55 will cut off transistor 78 to energize the amplifier and delay circuit 60 to produce the "turnoff" pulses on the output conductor 77 to the steering gates. If the first load, such as a radio, is turned "on," the transistor 101 will be rendered conductive to produce conduction of the SCR 106 thereby clamping the SCR 118 to zero voltage to render it nonconductive thus disconnecting the load from the bus 12. If the load Number 1, such as a radio, is turned "off" by its own switch or the switch SW 1 is open, the first steering gate will transmit the signal over 77 to the second steering gate. Each of the steering gates will sense the condition of the load and, if the loaded condition exists, the steering gates will cause disconnection of the respective load from the single bus 12 until the high current, low voltage, or low frequency signals become nonexistant from the respective sensor devices. If the aircraft resumes speed such that the ram-air turbine will increase in speed and cause high voltage, the voltage sensor will produce a signal on the base of transistor 79 in the amplifier and delay circuit 60 to disable the amplifier and delay circuit 60 whereupon no "turnoff" signals will appear on the output conductor 77. Failure of any signals occurring on the output conductor 77 will enable aircraft personnel to close switches 115 in higher priority equipment to render the SCR 106 in the steering gates nonconductive so that the power contact switches 1 through $n$ will reconnect the respective loads of increasing higher priority to the bus until power output of the emergency source and the loads again balance. In this manner the electrical loads will be automatically switched "off" to balance with the power capabilities of the emergency electrical voltage source supplying the single bus.

While many modifications and changes may be made in the constructional details and features of this invention to produce the same results and functions in similar applications in view of the teaching hereinabove set forth, applicant desires to be limited in the spirit of his invention only by the scope of the appended claims.

I claim:

1. An electrical bus monitoring system for aircraft comprising:
    a single electrical bus coupled through a plurality of switches respectively to a plurality of loads, the first of said switches being coupled to the load of lowest priority and each succeeding switch being coupled to loads of increasing priority;
    an emergency electrical energy source switchable to said electrical bus;
    a gate means coupled to each switch to control same and each coupled to the load coupling, respectively, to sense whether an electrical load exists, each gate means having an input with a pair of transistors sensitive to the load, said gate means inputs being serially coupled to cause said gate means to open said switches in sequence from lowest priority loads to higher priority loads in accordance with the existence of said loads and the availability of the bus energy, the first of said pair of transistors being coupled in said input series coupling and the second of said pair being coupled to control the corresponding switch, the no-load condition rendering said first transistor conductive of the input signal and the second transistor being nonconductive, and the load condition rendering said first transistor nonconductive and the second transistor conductive to cause the releated switch to open the circuit from the bus to the load; and
    a current and voltage sensor coupled to the output of said emergency electrical souce and to the input of the first gate means coupled to switch the load of lowest priority to produce electrical signals to said first gate means whenever either current and voltage are too low to supply proper current and voltage to said loads, said lower priority loads being switched off from said electrical bus until overload of current and voltage is eliminated.

2. An electrical bus monitoring system as set forth in claim 1 wherein
    said current sensor is in series with said emergency electrical source and said voltage sensor is in parallel with said emergency electrical source, an over-current being operative to apply a signal to said gate means and an over-voltage each being operative to prevent a signal from being applied to said gate means.

3. An electrical bus monitoring system as set forth in claim 2 wherein
    said coupling of said current and voltage sensor to the input of said first gate means includes a voltage reference, said voltage reference establishing the minimum voltage signal applied to said gate means.

4. An electrical bus monitoring system for aircraft comprising:
    a single electrical bus coupled in parallel through a plurality of switches respectively to a plurality of electrical loads, said switches each being normally closed and having an input to receive a switch opening signal;
    a steering gate coupled to the input of each switch to apply said switch opening signal and coupled to the load to sense a loaded and unloaded condition of said load, said load sense being by first and second conduction elements in each steering gate, except the last steering gate, the first conduction element of all said steering gates being coupled in series, except to the second conduction element in the last steering gate, to cause said steering gates to place said first conduction element in a conductive state and said second conduction element in a nonconductive state for the unloaded condition of related loads, and vice versa, and said steering gates having an input to said first conduction element of the first of said steering gates;
    an emergency electrical energy source switchable to said electrical bus;
    a current sensor serially coupled to the output of said emergency electrical source and having a current output;
    a current-to-voltage converter means coupled to said current sensor output to produce a voltage proportional to said current on an output thereof;
    a reference voltage means coupled to said converter output to conduct a voltage on said converter output above a predetermined minimum voltage;
    a voltage sensor coupled in parallel to the output of said emergency electrical energy source to produce voltage signals on a low voltage output and on a high voltage output; and
    an amplifier and delay circuit having three inputs and a single output coupled to the input of said first steering gate, the first of said inputs being coupled to the reference voltage output, the second of said inputs being coupled to the high voltage output, and the third of said inputs being coupled to the low voltage output, low voltage signals and high current being operative to produce an amplifier signal, and high voltage being operative to disable said amplifier whereby electrical loads are switched off until low voltage and high current of said emergency electrical source can meet the demands of said electrical loads.

5. An electrical bus monitoring system as set forth in claim 4 wherein
said emergency electrical source is direct current, and
said current sensor coupling to said current-to-voltage converter is through a chopper circuit to chop said direct current voltage from said emergency electrical source.

6. An electrical bus monitoring system as set forth in claim 4 wherein
said emergency electrical source is alternating current, and
said current sensor coupling to said current-to-voltage converter and said reference voltage means includes a frequency sensor constructed and arranged to produce a voltage on the input to said reference voltage applicable to activate said amplifier to produce switch opening signals of said electrical bus to said loads until the proper frequency of said alternating current emergency electrical source is re-established.

7. An electrical bus monitoring system as set forth in claim 4 wherein
said amplifier has each of its two inputs coupled to the base respectively of two transistors, the base of one of said two transistors being coupled to said high voltage output and the base of the second of said two transistors being coupled to said low voltage output the emitters of said two transistors coupled to a fixed ground potential, the collector of said one transistor coupled to said reference voltage output and the base of a third transistor of said amplifier input, and the collector of said second transistor coupled through a resistor to a collector voltage source and through a diode to the base of said third transistor.

8. An electrical bus monitoring system for aircraft comprising:
a single electrical bus coupled in parallel through a plurality of switches respectively to a plurality of electrical loads, said switches each being normally closed and having an input to receive a switch opening signal;
a steering gate coupled to the input of each switch to apply said switch opening signal and coupled to the load related to that switch to sense a loaded and unloaded condition of said load, said load sense being to the base of first and second transistors, the collector and emitter of the first transistor in all steering gates being serially coupled and the emitter of said first and the collector of the second transistors of each steering gate being coupled in common to cause said steering gates to place said first transistor into a conductive state and said second transistor in a nonconductive state for a no-load condition of related loads, and vice versa, the emitter output of said second transisaor being coupled to produce the output switch opening signal, and the input of the first in the sequence of steering gates being to the common emitter-collector coupling;
an emergency alternating current energy source switchable to said electrical bus;
a current sensor serially coupled to the output of said emergency energy source and having a current output;
a current-to-voltage converter means coupled to said current sensor output to produce a voltage proportional to said current on an output thereof;
a voltage referencing means having an input and an output with the input coupled to said converter output;
a frequency sensor coupled to said emergency energy source output to produce a voltage on an output whenever the frequency of said emergency energy source reaches a predetermined low frequency value, said output being coupled to the input of said voltage reference means;
a voltage sensor coupled to the output of said emergency energy source to produce a voltage signal on one output thereof when a predetermined low voltage is reached by said emergency energy source and to produce a voltage signal on a second output when a predetermined high voltage is reached by said emergency energy source; and
an amplifier and delay circuit having a first input on which a voltage signal will produce an amplified voltage signal on an output thereof, a second input on which a voltage signal will produce an amplified signal on said output, and a third input on which a voltage will disable said amplifier although voltage signals exist on said first and second inputs, said first input being coupled to the output of said voltage reference means, said second input being coupled to said one output of said voltage sensor, and said third input being coupled to said second output of said voltage sensor, and the output of said amplifier being coupled to the common emitter-collector input of the first in sequence of said steering gates whereby either of a predetermined low voltage, high current, and low frequency will switch said loads off of said electrical bus in sequence until energy source and load balance, and whereby a high voltage will disable said amplifier to supply all loads from said electrical bus without interruption.

9. An electrical bus monitoring system for aircraft comprising:
a single electrical bus coupled in parallel through a plurality of switches respectively to a plurality of electrical loads, said switches each being normally closed and having an input to receive a switch opening signal;
a steering gate coupled to the input of each switch to apply said switch opening signal and coupled to the load related to that switch to sense a loaded and unloaded condition of said load, said load sense being to the base of first and second transistors, the collector and emitter of the first transistor in all steering gates being serially coupled and the emitter of said first and the collector of said second transistors of each steering gate being coupled in common to cause said steering gates to place said first transistor into a conductive state and said second transistor in a nonconductive state for a no-load condition of related loads, and vice versa, the emitter output of said second transistor being coupled to produce the output switch opening signal, and the input of the first in the sequence of steering gates being to the common emitter-collector coupling;
an emergency direct current energy source switchable to said electrical bus;
a current sensor serially coupled to the output of said emergency energy source and having a current output;
a chopper circuit in said current output for chopping the current sensed from said emergency direct current energy source;
a current-to-voltage converter means coupled to said current sensor output to produce a voltage proportional to the chopped output current on an output thereof;
a voltage reference means having an input and an output with the input coupled to said converter means output;
a voltage sensor coupled to the emergency energy source to produce a voltage signal on one output thereof when a predetermined low voltage is reached by said emergency energy source and to produce a voltage signal on a second output when a predetermined high voltage is reached by said emergency energy source; and an amplifier and delay circuit having a first input on which a voltage signal will produce an amplified voltage signal on an output thereof, a second input on which a voltage signal will produce an amplified signal on said output, and a third input on which a voltage signal will disable said amplifier although voltage signals exist on said first and second inputs, said first input being coupled to the output of said voltage reference means, said second input being coupled to said one output of said voltage sensor, and said third input being coupled to said second output of said voltage sensor, and the output of said amplifier and delay circuit being coupled to the common emitter-collector input of the first in sequence of said steering gates whereby either of a predetermined high current and low voltage will switch said loads off of said electrical bus in sequence until the energy source and load balance, and whereby a high voltage will disable said amplifier to supply all loads from said electrical bus without interruption.

References Cited
UNITED STATES PATENTS

| | | | |
|---|---|---|---|
| 2,784,322 | 3/1957 | Johnson | 307—39 |
| 3,077,542 | 2/1963 | Daucherty | 307—34 |
| 3,271,580 | 9/1966 | Pope | 307—29 |
| 3,300,648 | 1/1967 | Rockefeller | 307—29 |

ORIS L. RADER, *Primary Examiner.*

T. J. MADDEN, T. B. JOIKE, *Assistant Examiners.*